(12) United States Patent
Blaszczynski

(10) Patent No.: US 8,238,571 B2
(45) Date of Patent: Aug. 7, 2012

(54) AUTOMATIC INPUT SENSITIVITY SELECTOR FOR AUXILIARY DEVICES

(75) Inventor: Luke S. Blaszczynski, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 1051 days.

(21) Appl. No.: 12/176,479

(22) Filed: Jul. 21, 2008

(65) Prior Publication Data

US 2010/0014687 A1   Jan. 21, 2010

(51) Int. Cl.
*H04B 1/00* (2006.01)
(52) U.S. Cl. ............ 381/86; 370/465; 370/270; 370/469
(58) Field of Classification Search .......... None
See application file for complete search history.

(56) References Cited

U.S. PATENT DOCUMENTS

| | | |
|---|---|---|
| 6,195,133 B1 | 2/2001 | Bae |
| 6,977,550 B2 | 12/2005 | Ishida et al. |
| 7,183,845 B2 | 2/2007 | Dauphinee et al. |
| 7,265,626 B2 | 9/2007 | Teo et al. |
| 2006/0209884 A1* | 9/2006 | MacMullan et al. .......... 370/465 |

* cited by examiner

*Primary Examiner* — David Vu
*Assistant Examiner* — Jonathan Han
(74) *Attorney, Agent, or Firm* — Young Basile Hanlon & MacFarlane, P.C.

(57) ABSTRACT

An audiovisual system including a circuit coupled to the first input and having an adjustable sensitivity control and a detector configured to detect the presence of a signal from the second input. The sensitivity control is responsive to the detector to set the sensitivity for a first input sensitivity level when the detector detects the presence of the signal from the second input and to set the sensitivity for a second input sensitivity level when the detector does not detect the signal from the second input.

13 Claims, 3 Drawing Sheets

AUTOMATIC INPUT SENSITIVITY SELECTOR FOR AUXILIARY DEVICES

FIELD OF THE INVENTION

The invention relates to the field of audiovisual systems for vehicles, and more particularly, the invention relates to audiovisual systems for vehicles that allow for adjustment of the input sensitivity at which a signal from an auxiliary device is received.

BACKGROUND

Portable entertainment devices have become common and include portable devices that generate audio output only, which are referred to herein as portable audio devices, as well as portable devices that generate both audio and video outputs, which are referred to herein as portable audiovisual devices. Examples of portable audio devices include digital music players, compact disc players, and cassette tape players. Examples of portable audiovisual devices include video game consoles, portable DVD players, and portable digital video players.

The voltages of the audio output signals provided by different portable entertainment devices is not standardized, which can cause volume discrepancies during playback. For example, a portable audio device may provide an output signal at a voltage of 300 mV, while a portable audiovisual device may provide its audio output at a voltage of approximately 1 V.

In response to the proliferation of portable entertainment devices, it has become common to include means for interfacing with portable entertainment devices in the audiovisual systems of vehicles. In a vehicle, volume discrepancies can cause driver distraction. For example, if an audio signal having a voltage of 1 V is provided to an automobile audiovisual system that is calibrated to receive input signals at 300 mV, the automobile audiovisual system will produce an abnormally loud output volume. If this occurs while a driver is operating the vehicle, the driver could become distracted by the unexpected change in volume. Conversely, if an audio signal having a voltage of 300 mV is provided to an audiovisual system that is calibrated to receive an audio input signal at 1 V, the resulting output volume will be abnormally soft, and the driver will likely increase the volume setting. Subsequently, when a different input source is selected, the automobile audio system may produce an abnormally loud output.

One known method for accommodating audio input signals of differing voltages is to provide a manual switch, by which a user may manually change the input sensitivity of the audiovisual system. While effective, an affirmative action by the user is required, and the user may not remember to adjust the input sensitivity prior to beginning operation of the portable audiovisual device. Another method involves detecting the voltage of the audio signal provided by the portable audiovisual device and adjusting the input sensitivity of the audiovisual system accordingly. However, this solution requires complicated circuitry that increasing the total cost of the vehicle's audiovisual system.

SUMMARY

The invention provides an audiovisual system that includes a first input and a second input. A circuit having an adjustable sensitivity control is coupled to the first input. A detector is configured to detect the presence of a signal from the second input. The sensitivity control of the circuit is responsive to the detector to set the sensitivity for a first input sensitivity level when the detector detects the presence of the signal from the second input. The sensitivity control is further responsive to the detector to set the sensitivity for a second input sensitivity level when the detector does not detect the signal from the second input.

According to an embodiment, the first input includes at least one audio input jack, and the second input includes at least one video input jack. Furthermore, the at least one audio input jack could be an RCA-type audio input jack, and the at least one video input jack could be an RCA-type video input jack.

In some embodiments, the audiovisual system may include an audio system that is coupled to the circuit, as well as a video display system that is coupled to the second input.

By other embodiments, the first input can be selectively connectable to an audio output of at least one of a portable audio device or a portable audiovisual device, while the second input can be selectively connectable to a video output of the portable audiovisual device.

In a further embodiment, the first input sensitivity level corresponds to a first predetermined voltage value, and the second input sensitivity level corresponds to a second predetermined voltage value. The first predetermined voltage value can be approximately 1 V. The second predetermined voltage can be approximately 300 mV.

In some embodiments, the detector detects the presence of a video output plug and a video input jack by sensing a video signal that is provided to the video input jack by the video output plug. In other embodiments, the detector includes a mechanical switch to detect the presence of the video output plug and the video input jack by sensing engagement of the video output plug and the video input jack.

The invention also provides a method for operating an audiovisual system that has an audio jack that is adapted for receiving an audio output plug, a video input jack that is adapted for receiving a video output plug, and an adjustable input sensitivity circuit. The method includes the steps of generating a control signal indicative of whether a plug is inserted into the video input jack, and setting the adjustable input sensitivity circuit in response to the control signal so that the input sensitivity is set at a first input sensitivity level when a video output plug is in the video input jack, and at a second input sensitivity level when no video output plug is in the video input jack.

By one embodiment, the method further includes the steps of setting the first input sensitivity level corresponding to a first predetermined voltage value and setting the second input sensitivity level corresponding to a second predetermined voltage value. By another embodiment, the method includes the steps of setting the first predetermined voltage at approximately 1 V and setting the second predetermined voltage at approximately 300 mV.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1A:
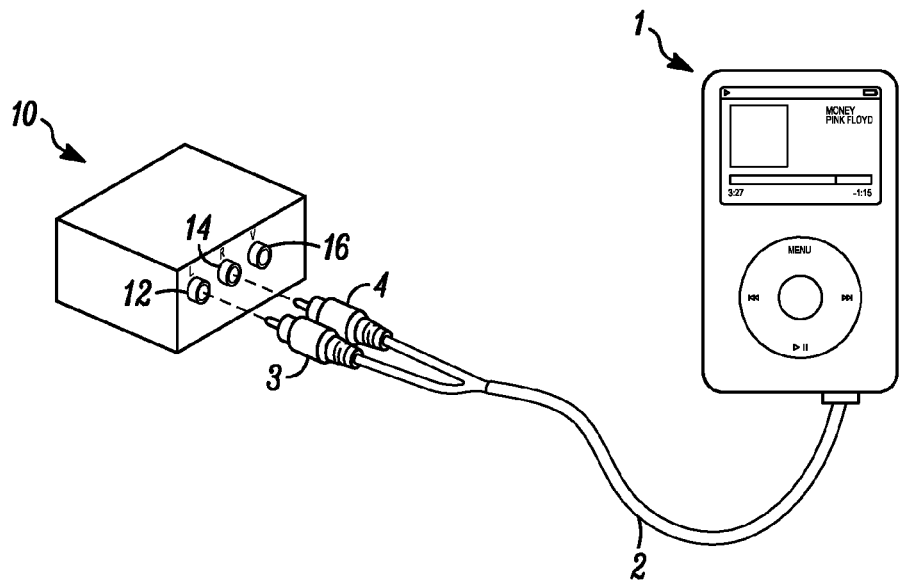
FIG. 1A is an illustration showing connection of a portable audio device to an audiovisual system according to the invention.
Figure 1B:
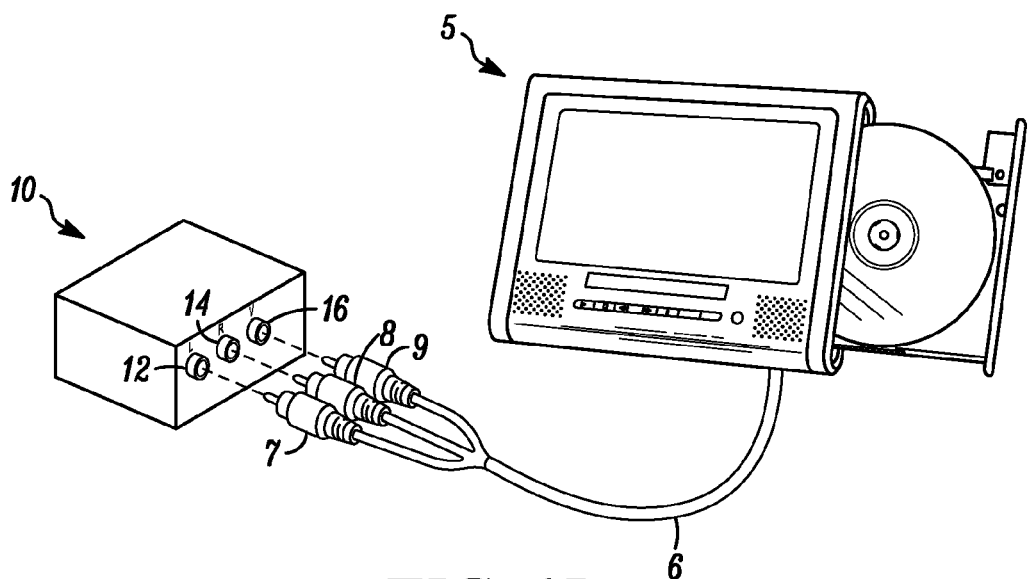
FIG. 1B is an illustration showing connection of a portable audiovisual device to the audiovisual system according to the invention.

FIGS. 1A-1B show an audiovisual system 10 according to the invention that is selectively connectable to an auxiliary device, such as a portable audio device 1 or a portable audiovisual device 5, so that the audiovisual system 10 can receive an input signal from the portable audio device 1 or the portable audiovisual device 5. The audiovisual system 10 may be mounted in a vehicle (not shown). To receive the input signal, the audiovisual system 10 may have one or more audio and video jacks or combined audio/video jacks of any type now known or hereafter devised. For example, the audiovisual system 10 could have a plurality of RCA-type audio and video jacks, such as a left audio input jack 12, a right audio input jack 14, and a video input jack 16. Alternatively, the audiovisual system 10 could receive the input signal wirelessly.

The portable audio device 1 can be any device operative to produce audio output signals. The portable audio device 1 may be selectively connectable to the audiovisual system 10 by an audio cable 2. The audio cable 2 may include a left audio input plug 3 and a right audio input plug 4, which are selectively connectable to the left audio input jack 12 and the right audio input jack 14, respectively.

The portable audiovisual device 5 can be any device operative to produce one or more audio output signals and one or more video output signals, such as a video game console, a portable DVD player, a portable digital video player, etc. The portable audiovisual device 5 may be selectively connectable to the audiovisual system 10 by an audiovisual cable 6. The audiovisual cable 6 may be an RCA-type audiovisual cable that has a left audio input plug 7, a right audio input plug 8, and a video input plug 9, which are selectively connectable to the left audio input jack 12, the right audio input jack 14, and the video input jack 16 of the audiovisual system 10.

Although the portable audio device 1 and the portable audiovisual device 5 are described herein as selectively connectable to the audiovisual system 10 using the audio cable 2 and the audiovisual cable 6, it should be understood that the portable audio device 1 and the portable audiovisual device 5 could be coupled to the audiovisual system 10 by other means. As an example, the invention could be applied to an audiovisual system 10 that is coupled to either a portable audio device 1 or a portable audiovisual device 5 by a single cable by utilizing a digital transmission, multiplexing, or other known methods. As another example, the audiovisual system 10 can be coupled to either of the portable audio device 1 or the portable audiovisual device 5 by a wireless connection. Moreover, any of the signal-transferring connections between components described herein can be achieved by coupling the components electrically, optically, wirelessly, or by any other means now known or hereafter devised, whether analog, digital, or otherwise.

Figure 2:
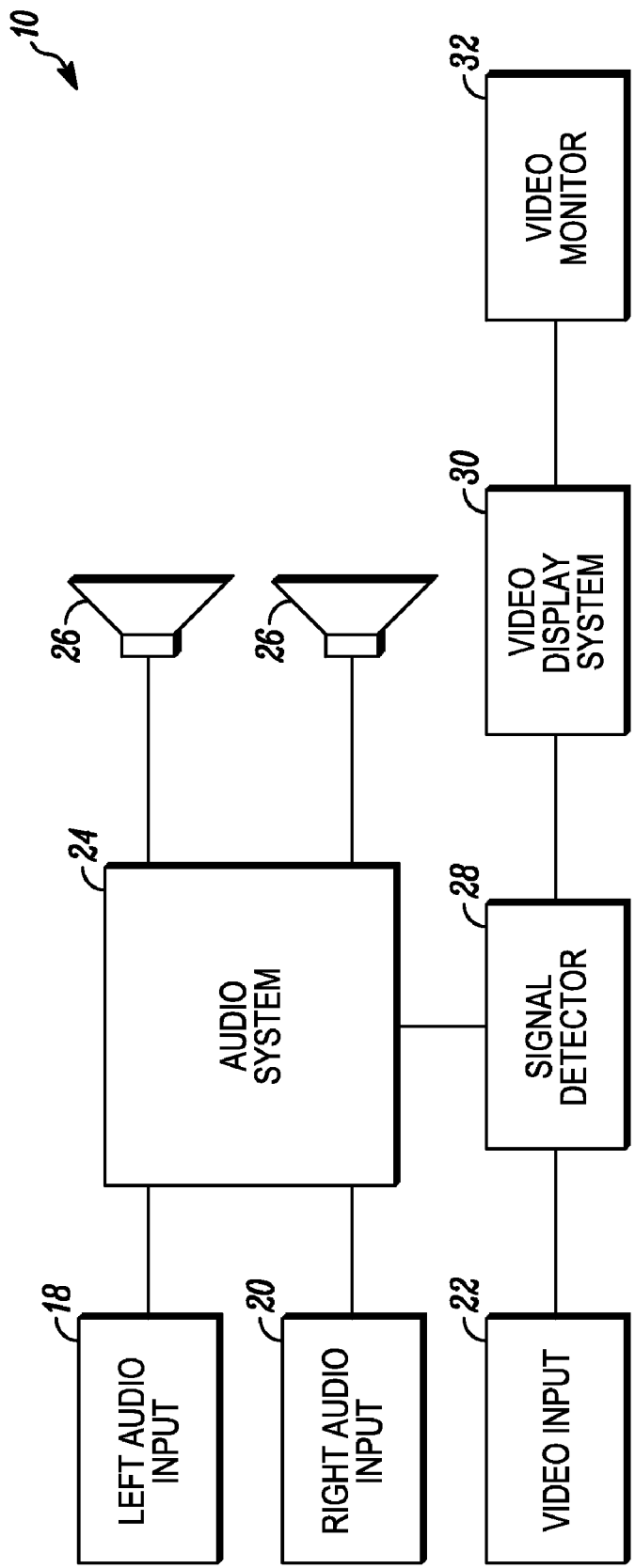
FIG. 2 is a block diagram showing an in-vehicle audio system having an automatic input sensitivity selector.

As shown in FIG. 2, the audio system receives a left audio input signal 18, a right audio input signal 20, and a video input signal 22, which are input signals that correspond to the output signals provided by the portable audio device 1 or the portable audiovisual device 5. The left audio input 18 and the right audio input 20 are coupled to an audio system 24 that has an adjustable audio signal characteristic, an adjustable sensitivity or an adjustable gain control. The audio system 24 conditions the signals provided by the left audio input signal 18 and the right audio input signal 20 and provides an adjusted signal or signals to one or more output devices, such as speakers 26.

The video input signal 22 is coupled to a signal detector 28. The signal detector 28 is configured to detect the presence of a signal from the video input 22. The signal detector 28 could detect the presence of a signal from the video input 22 by mechanically detecting the presence or absence of the video input plug 9 within the video input jack 16 of the audio visual system 10 using a switch that is engaged by the video input plug 9 upon insertion into the video input jack 16. Alternatively, the signal detector 28 could detect the presence of the video input plug 9 within the video input jack 16 electrically, for example, by detecting the signal provided to the video input 22 by way of the video input jack 16 from the video input plug 9. The signal detector 28 is coupled to the audio system 24 so that the audio system 24 can be responsive to the presence or absence of a video input signal 22, as will be explained in detail herein. The signal detector 28 is further coupled to a video display system 30, which receives and processes the video input signal 22 and then displays the processed video input signal 22 on an output device such as a video monitor 32.

Figure 3:
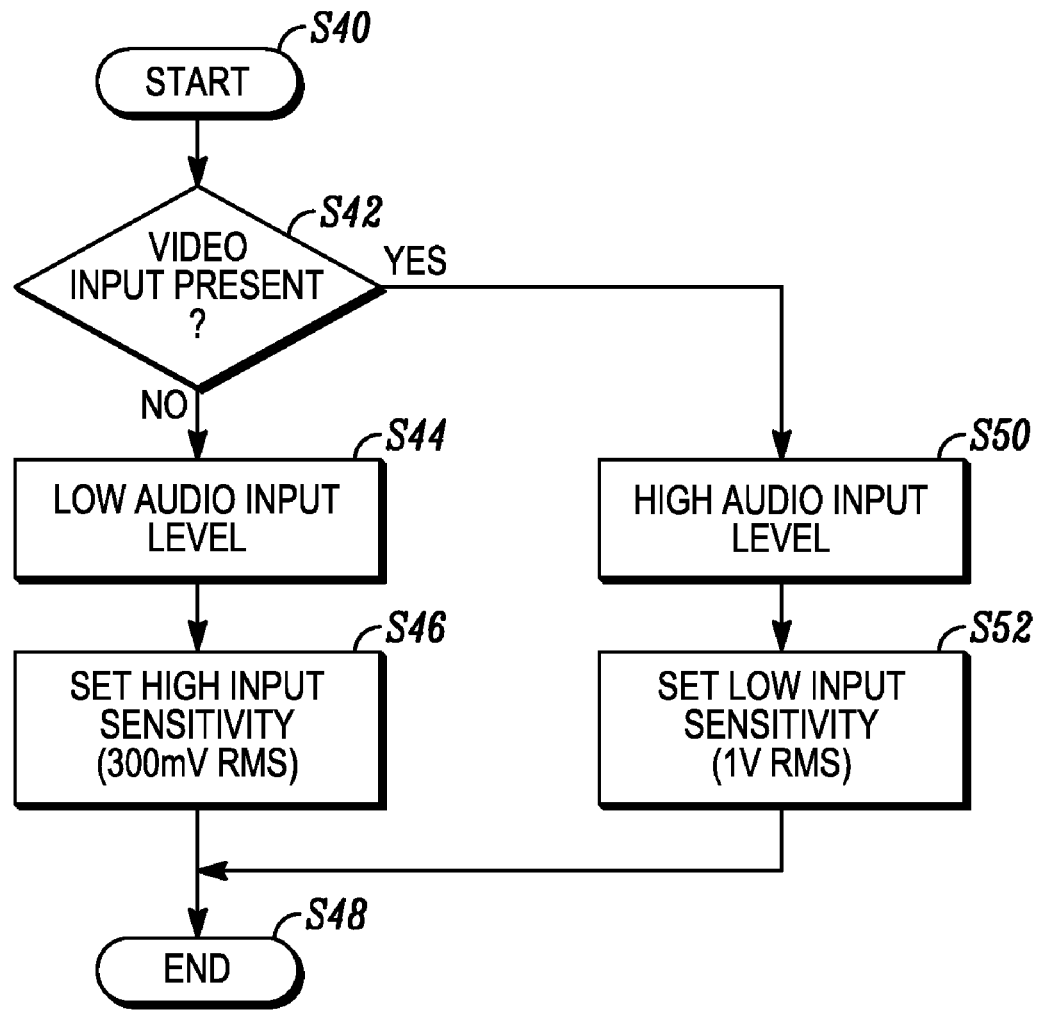
FIG. 3 is a flowchart showing operation of the automatic input sensitivity selector according to the first embodiment.

As will be explained with reference to FIG. 3, the audio system 24 adjusts the audio signal characteristic of the audiovisual system 10 based on the presence or absence of the video input signal 22. After the process starts in step S40, the audio system 24 determines whether or not the video input signal 22 is present in step S423 based on input provided to the audio system 24 by the signal detector 28. If the audio system 24 determines that the video input signal 22 is not present, the process proceeds to step S44. If the audio system 24 determines that the video input signal 22 is present, the process proceeds to step S50. In step S44, it is judged that a low audio input level is present, and the process proceeds to step S46. In step S46, the audio system 24 sets a high input sensitivity level, for example, 300 mV, and the process then ends at step S48. If the audio system 24 determined that the video input signal 22 was present in step S42, the audio system 24 judges that a high audio input level is present in step S50, and the process proceeds to step S52. In step S52, the audio system 24 sets a low input sensitivity level, such as 1 V, and the process then ends at step S48.

In use, a user may connect either a portable audio device 1 or a portable audiovisual device 5 to the audiovisual system 10. If the user couples a portable audio device 1 to the audiovisual system 10, the signal detector 28 determines that the video input signal 22 is not present. In response to the absence of the video input signal 22 as determined by the signal detector 28, the audio system 24 sets a high input sensitivity or high gain for the audio system 24 and adjusts the left and right audio input signals 18, 20 accordingly before passing those signals to the speakers 26.

If the user couples the portable audiovisual device 5 to the audiovisual system 10, the signal detector 28 detects the presence of the video input signal 22. In response to the presence of the video input signal 22, the audio system 24 adjusts the left audio input signal 18 and the right audio input signal 20 according to a low input sensitivity value and passes the resulting audio output signal to the speakers 26.

Although the invention has been described in connection with an audiovisual system 10 having a single set input jacks, such as the left audio input jack 12, the right audio input jack 14, and the video input jack 16, it should be understood that the invention is not limited to an audiovisual system 10 having a single set of input jacks. On the contrary, the audiovisual system 10 could have multiple sets of input jacks. For example, multiple sets of input jacks could be provided to allow simultaneous connection of the portable audio device 1 and the portable audiovisual device 5 to the audiovisual system 10, and a user operated switch could be provided to allow the user to select which set of input jacks is utilized. In this case, the signal detector 28 would determine whether the video input signal 22 is present with reference to the set of input jacks selected by the user.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An audiovisual system, comprising:
   a first input for receiving a first signal;
   a second input for receiving a second signal;
   a detector configured to detect the presence of the second signal at the second input; and
   an adjustable gain circuit coupled to the first input, wherein the adjustable gain circuit is configured to receive the first signal from the first input and generate an output signal by applying a first gain level to the first signal when the detector detects the presence of the second signal at the second input, and by applying a second gain level to the first signal when the detector does not detect the second signal at the second input.

2. The audiovisual system stated in claim 1, further comprising:
   the first input including at least one audio input jack; and
   the second input including at least one video input jack.

3. The audiovisual system stated in claim 2, wherein the at least one audio input jack is an RCA-type audio input jack and the at least one video input jack is an RCA-type video input jack.

4. The audiovisual system stated in claim 1, further comprising:
   an audio system coupled the adjustable gain circuit; and
   a video display system coupled to the second input.

5. The audiovisual system stated in claim 1, further comprising:
   the first input selectively connectable to an audio output of at least one of a portable audio device or a portable audiovisual device; and
   the second input selectively connectable to a video output of the portable audiovisual device.

6. An audiovisual system, comprising:
   an audio input jack adapted for receiving an audio output plug;
   a video input jack adapted for receiving a video output plug;
   a detector configured to detect the presence of a video output plug in the video input jack, the detector generating a control signal indicating of the presence or absence of a video output plug in the video input jack; and
   an adjustable gain control circuit having an input coupled to the audio input jack,
   wherein the adjustable gain control circuit is responsive to the control signal to apply a first gain level to an audio signal received at the audio input jack when the video output plug is in the video input jack, and to apply a second gain level to the audio signal received at the audio input jack when the video output plug is not in the video input jack.

7. The audiovisual system of claim 6, further comprising:
   the detector detects the presence of the video output plug in the video input jack by sensing a video signal provided to the video input jack by the video output plug.

8. The audiovisual system of claim 6, further comprising:
   the detector includes a mechanical switch to detect the presence of the video output plug in the video input jack by sensing engagement of the video output plug and the video input jack.

9. The audiovisual system stated in claim 6, wherein the audio input jack is an RCA-type audio input jack and the video input is an RCA-type video input jack.

10. The audiovisual system stated in claim 6, further comprising:
    an audio system coupled to the adjustable gain circuit; and
    a video display system coupled to the video input jack.

11. The audiovisual system stated in claim 6, further comprising:
    the audio output plug coupled to at least one of a portable audio device or a portable audiovisual device; and
    the video input plug coupled to a portable audiovisual device.

12. A method for operating an audiovisual system having an audio jack adapted for receiving an audio output plug, a video input jack adapted for receiving a video output plug, and an adjustable gain circuit, comprising:
    generating a control signal indicative of whether a plug is inserted into the video input jack; and
    setting the adjustable gain circuit in response to the control signal so that the adjustable gain circuit applies a first gain level to an audio signal received at the audio jack when a video output plug is in the video input jack, and the adjustable gain circuit applies a second gain level to an audio signal received at the audio jack when no video plug is in the video input jack.

13. An audiovisual system, comprising:
    an audio input for receiving an audio input signal;
    a video input for receiving a video input signal;
    a detector configured to detect the presence of the video input signal at the video input; and
    an adjustable gain circuit coupled to the audio input, wherein the adjustable gain circuit is configured to generate an output signal by applying a first gain level to the audio signal when the detector detects the presence of the video input signal at the video input, and by applying a second gain level to the audio signal when the detector does not detect the video input signal at the video input.

* * * * *